3,295,412
MAGNETIC GRADIENT PARTICLE ACCELERATOR

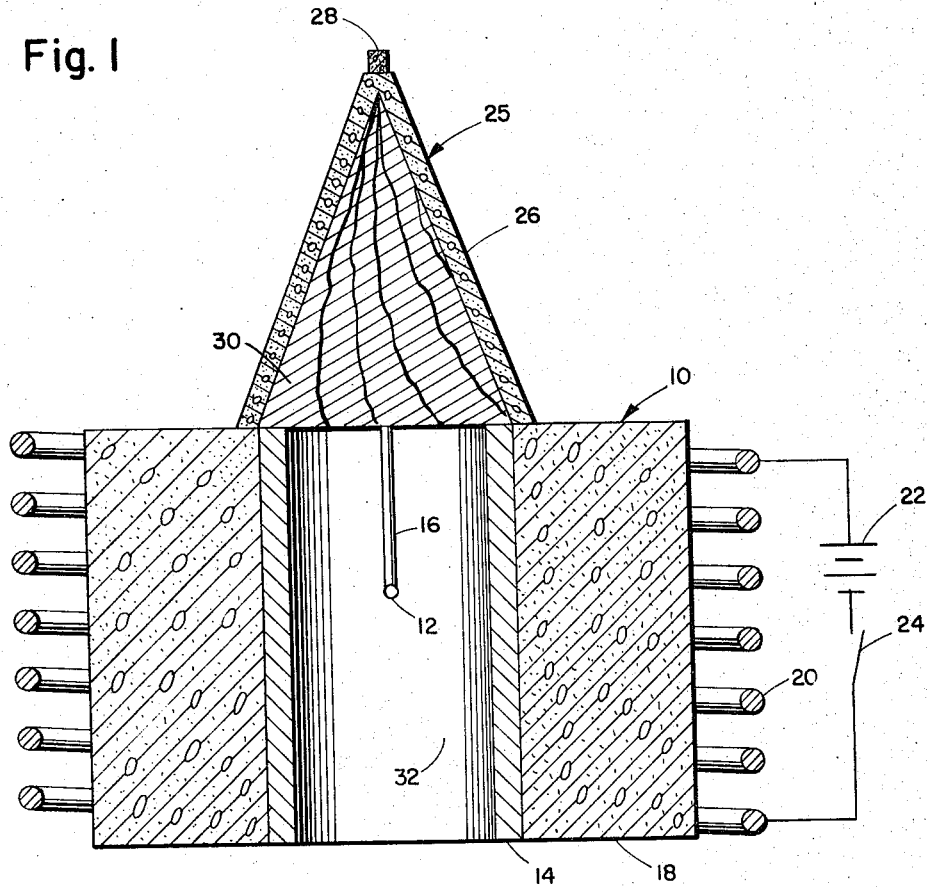
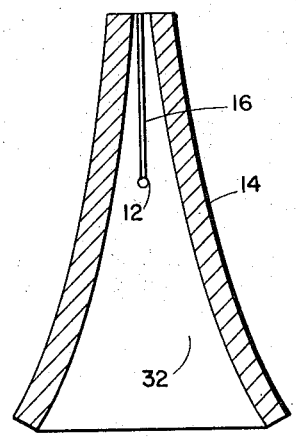

Morgan J. Morley, Berkeley, and David I. Gilbert, Walnut Creek, Calif., assignors, by mesne assignments, to Aerojet-General Corporation, El Monte, Calif., a corporation of Ohio
Original application Dec. 4, 1963, Ser. No. 328,025, now Patent No. 3,254,564, dated June 7, 1966. Divided and this application Sept. 21, 1965, Ser. No. 505,300
5 Claims. (Cl. 89—8)

This is a division of our copending application, Serial No. 328,025, filed December 4, 1963, now U.S. Patent No. 3,254,564.

This invention relates to particle accelerators generally and more particularly to particle accelerators employing a magnetic field gradient.

Those concerned with research on the hypervelocity impact of micrometeorites have long recognized the need for a device to accelerate small particles, in the size range of 100–1000 microns, to velocities of 20 km./sec. and higher. Light gas guns, using gases such as hydrogen at high sonic speeds, are only capable of producing velocities up to 8–10 km./sec. for the particle size range of interest. Present particle accelerators, using either shaped explosive charges or exploding films are likewise limited to velocities up to 10 km./sec. The shaped charges or exploding films use the direct force of the explosion for acceleration.

It is therefore the principal object of this invention to provide a novel method of and improved means for accelerating small particles to extremely high velocities.

Another object of this invention is to provide a novel particle accelerator employing a magnetic field gradient to accelerate small metallic particles.

Still another object of this invention is to provide a novel particle accelerator to accelerate 100–1000 micron particles to velocities of 20 km./sec. or higher.

In its principal aspect, the present invention comprises a metallic particle around which there is arranged a cylindrical conductor, a ring of high energy explosive, and an inductor. The inductor, adapted for series connection to a power source, establishes a large axial magnetic field in the space around the metallic particle. Detonation of the high energy explosive at one end causes the cylindrical conductor to implode as a cone, thus increasing the magnetic field around the metallic particle and creating a convergence of the magnetic field with a resultant large magnetic gradient. The radial component of the magnetic gradient or pressure from the converged field exerts a large accelerating force on the particle and propels it from the device. The constraining magnetic pressure exerted by the implosion assists in preventing any particle deformation. In this manner, it is possible to achieve particle velocities above 20 km./sec.

These and other objects, advantages, and features of the present invention will be apparent to those skilled in the art from the following description taken together with the appended drawings, wherein, FIG. 1 is a diagrammatic cross-sectional view of the novel particle accelerator of the present invention, and FIG. 2 is a diagrammatic view illustrating the implosion of the conductor of FIG. 1.

Referring now to FIG. 1, there is shown the basic particle accelerator 10 of the present invention. The metallic particle 12 to be accelerated is placed on the axis of a cylindrical shell 14 hereinafter referred to as the conductor or armature. The particle 12 of an electrically conductive material such as aluminum, copper, beryllium, or the like is supported at the end of a capillary tube 16 or other suitable means. The armature 14 is of a diamagnetic material, that is, having a relative magnetic permeability slightly less than unity. A metallic conductor, such as copper, would be suitable. A cylindrical ring 18 of high energy explosive such as TNT (trinitrotoluene) or RDX (cyclotrimethylene trinitramine) is concentrically arranged about the armature 14. Preferably, the explosive is a mixture of TNT and RDX known commercially as Composition B. Concentrically arranged about the explosive ring 18 is an inductor 20 adapted to be connected in electrical series to a power source 22 and starting switch 24.

A wave generator 25 is employed to ignite the high energy explosive ring 18. This wave generator 25 comprises a hollow cone 26 of high energy explosive having its base in contact with one end of the high energy explosive ring 18 of the accelerator 10. This cone 26 is filled with an inert filler 30 such as wood or polyurethane and has a detonator 28 at its apex. The wood filler 30 can be used to support the capillary tube 16.

Assembly of the particle accelerator 10 is easily accomplished. The position prior to the initiation of an acceleration is as shown in FIG. 1. The configuration of the components holds the assembly together. The wave generator 25 can merely be placed on top of the accelerator 10.

To initiate the acceleration of the particle 12 the starting switch 24 is closed thereby connecting the power source 22, such as a D.-C. battery or capacitor bank, to the inductor 20 which is a coil having a plurality of turns. The inductor 20 establishes a large magnetic field, up to 20 kilogauss, in the space 32 inside the armature 14. Since the armature 14 is of a diamagnetic material and tends to exclude the magnetic field sufficient time must be allowed for the build-up of the field inside the armature 14. When a capacitor bank is used as the power source 22 it may be necessary to provide narrow longitudinal slots (not shown) in the armature 14 to permit the entry of the magnetic flux into the space 32. The explosive cone 26 is ignited by means of the detonator 28. This cone 26 transmits a detonation wave to the periphery of the high explosive ring 18. To achieve maximum results the base of the cone 26 should contact the ring 18 near its inner diameter. Ignition of the high energy explosive ring 18 sets up an explosive force which acts upon the armature 14. This explosive force as it proceeds down the ring 18 causes the armature 14 to implode as a cone with the apex at the end where the ring 18 was ignited. The ignition of the explosive ring 18 is timed so as to implode the armature 14 when the magnetic field in the space 32 is at a maximum. There is no need to protect the inductor 20 from the force of the explosive since the magnetic flux is locked in the space 32 and the armature 14.

This implosion of the armature 14 is illustrated in FIG. 2. It compresses the magnetic field in the space 32 within the armature 14 to extremely high values above 10 megagauss. The geometry of the armature 14 as it implodes, namely as a cone, causes a convergence of the magnetic field and results in a resultant large magnetic gradient which is greatest at the apex of the armature cone. The magnetic pressure from the radial component of this field gradient exerts an extremely large accelerating force on the particle 12. The particle 12 is thus accelerated the length of the armature 14 and ejected from the accelerator 10 at a velocity in excess of 20 km./sec.

While a number of details of construction have been illustrated and described, alternatives and equivalents will occur to those skilled in the art which are within the spirit and scope of this invention. It is, therefore, desired that protection not be limited to the details illustrated and described, but only by the proper scope of the appended claims.

What is claimed is:

1. An improved particle accelerator comprising: a metallic particle, a hollow cylindrical conductor adapted to contain said particle on its longitudinal axis, a concentric cylinder of high energy explosive arranged about said conductor, and an induction coil concentrically arranged about said explosive, said induction coil adapted to establish a magnetic field around said metallic particle and said explosive adapted to implode said conductor around said particle so as to converge the magnetic field and thereby accelerate said particle.

2. The improved particle accelerator described in claim 1 and in addition a wave generator adapted to simultaneously detonate one end surface of said explosive cylinder.

3. An improved particle accelerator comprising: a metallic particle, a hollow conductor in which said metallic particle is disposed, at least one inductor arranged about said conductor, power means for providing electric energy to said inductor for establishing a magnetic field within said conductor and around said particle when said inductor is energized, and an explosive charge arranged about said conductor, and said conductor being imploded in a conical shape about said particle in response to the detonation of said explosive charge for converging the magnetic field around said particle to produce a magnetic gradient causing said particle to be accelerated through said conductor.

4. An improved particle accelerator comprising: a metallic particle, a hollow cylindrical conductor in which said metallic particle is disposed, a cylindrical explosive charge concentrically arranged about said conductor, at least one inductor arranged about said explosive charge and said conductor, and power means for providing electric energy to said inductor for establishing a magnetic field within said conductor and around said particle when said inductor is energized, said conductor being imploded in a conical shape about said particle in response to the detonation of said explosive charge for converging the magnetic field around said particle to produce a magnetic gradient causing said particle to be accelerated through said conductor.

5. An improved particle accelerator comprising: a metallic particle, a hollow cylindrical conductor in which said metallic particle is disposed, a cylindrical explosive charge concentrically arranged about said conductor, at least one inductor arranged about said cylindrical explosive charge and said conductor, power means for providing electric energy to said inductor for establishing a magnetic field within said conductor and around said particle when said inductor is energized, and means for simultaneously detonating one end surface of said cylindrical explosive charge comprising a hollow cone of explosive having its base contiguous to said end surface of said cylindrical explosive charge, said conductor being imploded in a conical shape about said particle in response to the detonation of said cylindrical explosive charge for converging the magnetic field around said particle to produce a magnetic gradient causing said particle to be accelerated through said conductor.

References Cited by the Examiner

UNITED STATES PATENTS

| | | |
|---|---|---|
| 2,774,306 | 12/1956 | MacLeod. |
| 3,113,272 | 12/1963 | Cannon et al. _____ 328—1 |
| 3,126,789 | 3/1964 | Meyer _____ 89—8 |
| 3,148,587 | 9/1964 | Melhart _____ 89—8 |
| 3,224,337 | 12/1965 | Ford et al. _____ 89—8 |

BENJAMIN A. BORCHELT, *Primary Examiner.*

SAMUEL W. ENGLE, SAMUEL FEINBERG,
*Examiners.*